C. B. COON.
COMBINED TRACTION WHEEL AND TRACK.
APPLICATION FILED AUG. 7, 1911.
1,117,640.
Patented Nov. 17, 1914.
3 SHEETS—SHEET 3.
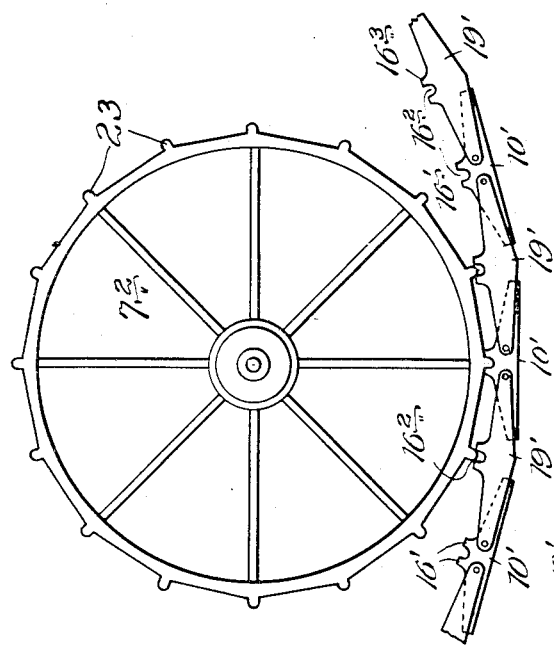
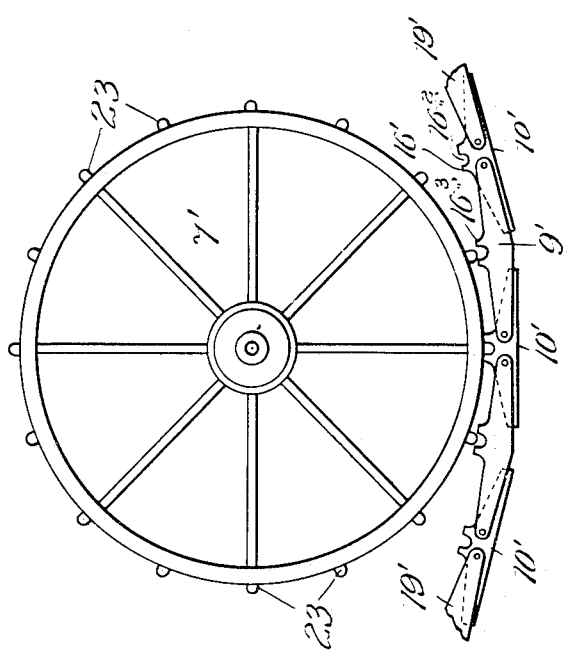
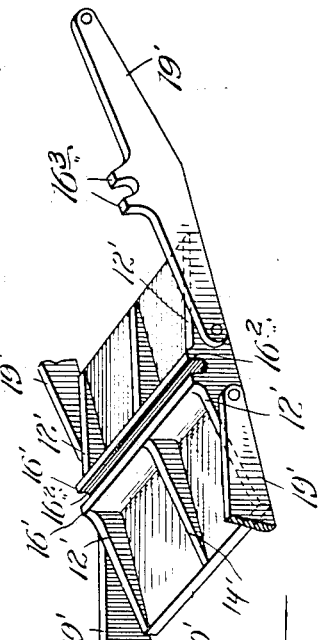
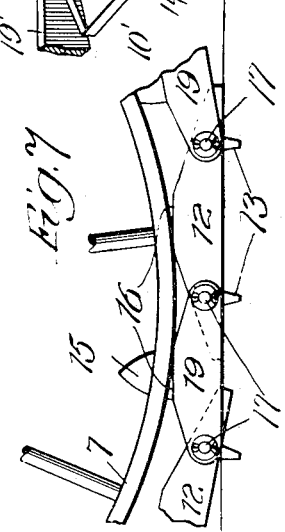
Witnesses:
Inventor:
Charles B. Coon,

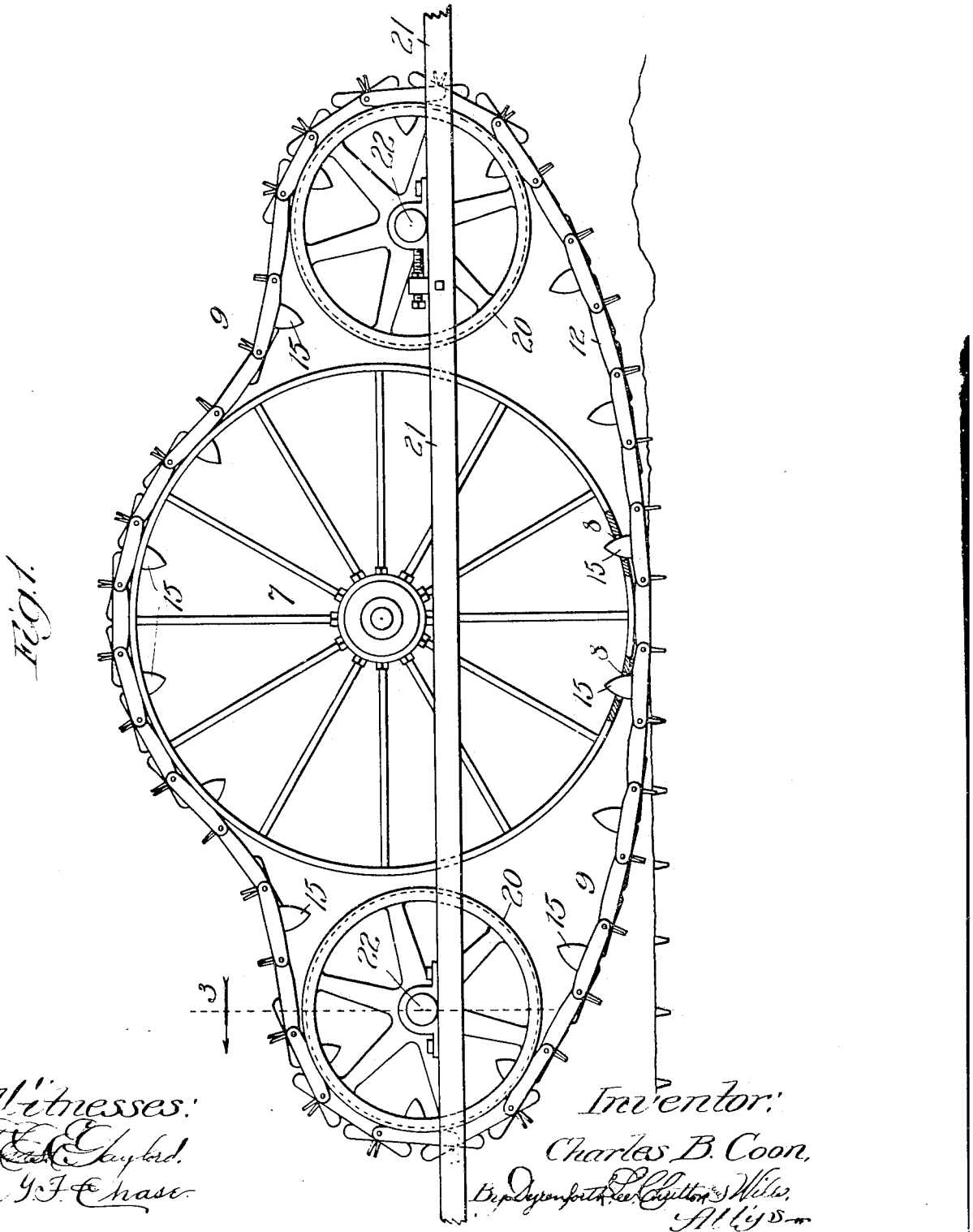

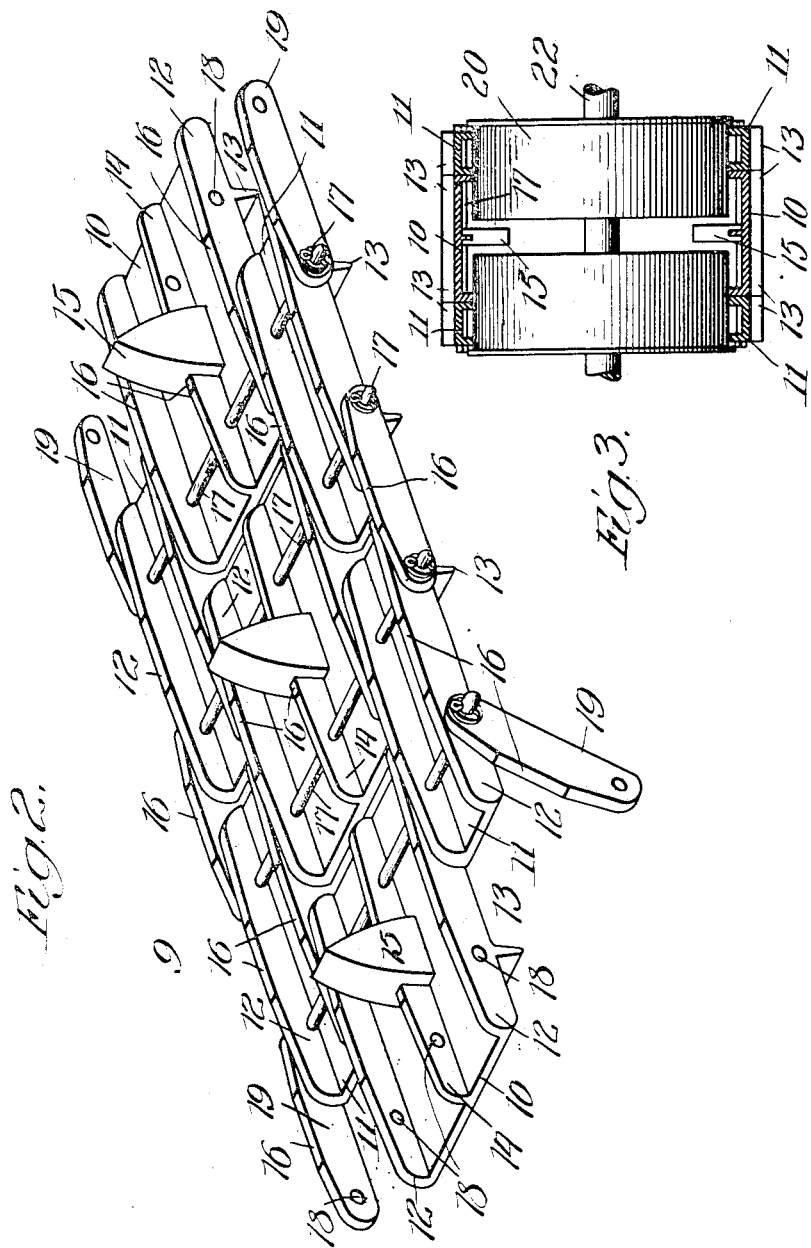

UNITED STATES PATENT OFFICE.

CHARLES B. COON, OF EVANSTON, ILLINOIS.

COMBINED TRACTION-WHEEL AND TRACK.

1,117,640.  Specification of Letters Patent.  Patented Nov. 17, 1914.

Application filed August 7, 1911. Serial No. 642,795.

*To all whom it may concern:*

Be it known that I, CHARLES B. COON, a citizen of the United States, residing at Evanston, in the county of Cook and State of Illinois, have invented a new and useful Improvement in Combined Traction-Wheels and Tracks, of which the following is a specification.

The primary object of my invention is to provide a novel construction of combined traction-wheel and endless self-laying flexible track therefor, which shall prevent uneven depression of the track under the weight upon it of the load carried by the wheel and resultant digging of the track-sections into soft ground.

To accomplish my aforesaid object, I cause the wheel to travel along the track with uniform step and motion whereby it passes from a point on one shoe, or link, to a point on the next adjacent shoe, or link across an unbridged gap between points, without imposing the weight directly upon the track intermediate those points. In the forms of the invention which I have illustrated, I have shown shoes and links provided midway or thereabout with step-portions so that the wheel in traveling along the track treads in each stepping between the ends of sections or links of the flexible track, thus distributing the load uniformly, or approximately so, over the sections. Moreover, the stepping motion of the wheel along the track should be such, in transferring the load from one section of the track to the next adjacent section thereof, as to retain part of the load on the rear section while it is being transferred to the next adjacent forward section, thereby to augment the area of the flexible track over which the wheel, in traveling, distributes the load.

In the accompanying drawings—Figure 1 shows one form of my improved coöperating traction-wheel and track by a view in side elevation; Fig. 2 is a perspective view of a portion of the endless flexible track shown in Fig. 1; Fig. 3 is a section on line 3, Fig. 1; Fig. 4 is a broken view in side elevation illustrating a modified construction of the coöperating wheel and track; Fig. 5 is a similar view showing another modification of the same; Fig. 6 is a perspective view of a modified construction of the flexible track, showing it in its simplest form; and Fig. 7 is a view like but showing only a portion of the representation in Fig. 1, to present more prominently than in that figure and Fig. 2, the steps, and to illustrate how the wheel in transferring the load from a rear section of the track to the next adjacent forward section thereof, bears upon both sections before clearing the rear step.

In the construction illustrated in Fig. 1 the traction-wheel 7 is cylindrical and provided at uniform intervals with tooth-admitting holes 8 in its rim; and the flexible endless track 9 is of the general chain-construction illustrated in Fig. 2, built of flexibly-connected series of shoes 10 and 11, of metal, or wood, or both, or of other suitable material, and of the same general shape and length, though the central shoes 10 are about twice the width of the lateral shoes 11. Each shoe is of preferred generally-rectangular shape with flanges 12 extending along its lateral edges and of greater thickness, for strength, than the body of the shoe, from the face of which opposite that provided with the flanges project anchoring-teeth 13. Each relatively-wider shoe 10 is also provided with a central longitudinal flange 14; and from the centers of these flanges project strong sprocket-like teeth 15 to register with the wheel-rim holes 8. The shoe-flanges, which are shown to have straight outer edges, incline on their inner edges to opposite ends of straight sections 16, forming raised portions or steps for the purpose hereinafter explained.

To assemble the parts forming the track the longitudinal series of shoes 11 are laid to extend along and parallel with the series of shoes 10 at opposite sides of the latter, with each shoe in a side-series coinciding with the side-shoe opposite it, but crossing or lapping the adjacent ends of two of the shoes 10 between them, thus disposing the side and central shoes in break-joint relation to each other; and it is desirable, though not necessary, that the ends of the side-shoes coincide, at least approximately, with the transverse centers of the central shoes, and vice versa. The several series of the shoes are connected in a manner to join each shoe with the shoe lapping it, preferably by the means illustrated, consisting of pivoting rods 17 passed through coincident holes 18 in the flanges 12, the ends of the rods projecting beyond the side-shoes to adapt them to be used for fastening together the series of shoes, as by means of side-links 19 pivotally connecting adjacent rods in pairs at their ends and which should tread the ground like the shoes. As in the case of the shoe-flanges, each link is shown to have a straight outer edge with its inner edge inclining toward a central step 16.

To employ a track of the described construction with a traction-wheel 7, the track in endless form extends about the wheel and about idlers 20 journaled, respectively, in front of and behind the wheel 7, on a frame 21 of a suitable carriage. Each idler consists of a pair of pulleys on a shaft 22 for guiding the endless track and permitting the teeth 15 to pass without obstruction.

The wheel, in its rotation, under the ordinary driving action of an engine on the carriage referred to, or when the carriage is pulled by any power, picks up the teeth 15 in succession and moves along the track in the direction toward the right-hand end of Fig. 1, at the same time shedding the teeth from its holes 8 as the track passes over the wheel and thus effecting the laying of the track. The spaced raised sections or steps 16, alone, of the track are trodden by the wheel, and they being disposed centrally between the ends of the pivotal track-sections, the wheel bears upon them only between their ends, and thus without tilting them longitudinally, and, as a consequence, digging them into the soil, but distributing the load uniformly over each section; and by causing the wheel in transferring the load from one section of the track to the adjacent section in advance thereof, to bear against both sections across the gap between steps, as indicated by the representation in Fig. 7, the advantage is afforded of materially increasing the area of load-distribution over the track.

The mutually-lapping construction of the pivotal track-sections illustrated in Fig. 2 is advantageous in making the stepping of the wheel shorter and causing the weight of the traction-wheel at its bearing-line across any transverse series of the track-sections to be distributed over an area covered not only by the track-sections immediately trodden by the wheel, but also over the area covered by adjacent sections. Moreover, since the bearing of the wheel is only upon the flanges of the shoes and the links, friction is reduced to the minimum.

While the described weight-distribution over the track renders the sections of the latter on which the wheel bears an inflexible part of the track for the time being, the track readily yields to flexure at short distance both before and behind the wheel, and enables it to perform smoothly and easily its track-laying function.

The number of longitudinal series of shoes employed to make up the flexible track may be two or more with the shoes of any desired dimensions and shape. Moreover, it is within my invention to construct the track as indicated in Fig. 6, employing only one series of shoes $10^1$ corresponding with those shown in Fig. 2 as forming the central series, but of a slightly different construction hereinafter described, and connected at opposite sides of their transverse centers by links $19^1$ pivoted to the sides of each shoe. The body of the shoe $10^1$, which has a flat outer surface, gradually thickens or flares on the inner surface from its opposite ends to its transverse center, where it is formed with a transverse step $16^1$ containing a longitudinal groove $16^2$; and the lateral flanges $12^1$ and intermediate flange $14^1$ taper from the sides of the step to the ends of the body. The form of the link $19^1$ employed with shoes $10^1$ is shown as widening toward its transverse center by inclining thereto its outer edge from the opposite ends of the link, which is provided with an inner straight edge having a central grooved step $16^3$. By forming the links $19^1$ with oppositely beveled outer edges, when a shoe $10^1$ is flat upon the ground the adjacent sections of the links aline, at their lower edges, at least approximately, with the flat outer face of the shoe.

With the last-described construction of track may be used the circular traction-wheel $7^1$ of Fig. 4, or the polygonal traction-wheel $7^2$ of Fig. 5, each of which is provided with ribs or projections 23 on its rim at uniform intervals to register with the grooved steps in the track. The intervals between ribs on the polygonal wheel $7^2$ correspond with the faces thereof, as shown.

The stepping action of the traction-wheel with the constructions described with reference to Figs. 4 and 5, in preventing tipping of the track-sections by pressure of the load being exerted upon the steps $16^1$, $16^3$, is the same as that described with reference to Fig. 1, the entrance of the ribs 23 into the grooves of the steps, however, causing the sprocket-action between the wheel and track.

Although I have shown and described several forms of embodiment of my invention, I do not intend to be understood as limiting it thereto, but as claiming broadly any methods or means of carrying it out.

What I claim as new and desire to secure by Letters Patent is—

1. In combination, a traction-wheel and track therefor, said track comprising sections provided with relatively short raised portions forming spaced steps for the wheel tread with unbridged gaps between them, whereby, in the travel of the wheel, the load is imposed directly upon the track only at intervals thereof.

2. In combination, a traction-wheel and a self-laying track therefor comprising sections hinged together, with interposed steps forming relatively-short portions of the lengths of the sections, spaced apart by unbridged gaps to cause the steps to be trodden successively by the wheel and transfer the load from section to section by treading an advance-section of the track across the intervening space before clearing the adjacent rear section thereof.

3. In combination, a traction-wheel and a self-laying endless track therefor comprising sections hinged together in longitudinal series and provided between their ends with steps forming relatively-short portions of the lengths of the sections uniformly spaced apart by unbridged gaps causing the steps to be trodden successively by the wheel and transfer the load from section to section by treading an advance-section of the track across the intervening space before clearing the adjacent rear section thereof.

4. In combination, a traction-wheel and a self-laying endless track therefor comprising a plurality of longitudinal series of shoes, the shoes in each series lapping those in the adjacent series and each shoe in each series being flexibly connected at different points between series with two successive shoes in the adjacent series, and steps on the shoes forming relatively-short portions of their lengths, spaced apart by unbridged gaps causing the steps to be trodden successively by the wheel and transfer the load from shoe to shoe by treading an advance-shoe of the track before clearing the adjacent rear section thereof.

5. In combination, a traction-wheel and a self-laying endless flexible track therefor extending about the wheel and comprising sections hinged together in longitudinal series and provided between their ends with relatively-short steps forming unbridged gaps between treads for the wheel in its travel upon the track.

6. In combination, a traction-wheel and a self-laying endless flexible track therefor extending about the wheel and comprising longitudinal series of shoes and side-links mutually lapping each other and flexibly interconnected between series, with relatively-short steps on the shoes and links between their ends forming unbridged gaps between treads for the wheel in its travel upon the track.

7. In combination, a traction-wheel and a self-laying endless track therefor extending about the wheel and comprising longitudinal series of shoes and side-links lapping the shoes to a point approximately midway between their ends and transverse centers, or thereabout, said shoes and links being flexibly interconnected, and relatively-short steps on the shoes and links between their ends, forming unbridged uniform gaps between treads for the wheel in its travel upon the track.

8. In combination, a traction-wheel and a self-laying endless track therefor extending about the wheel and comprising longitudinal series of flexibly-interconnected shoes and side-links, with longitudinal flanges on the inner faces of the shoes and relatively short steps thereon between their ends forming unbridged gaps between treads for the wheel in its travel upon the track.

9. In combination, a traction-wheel and a self-laying endless track therefor extending about the wheel and comprising longitudinal series of flexibly-interconnected shoes and side-links with longitudinal flanges on the inner faces of the shoes having raised intermediate sections forming unbridged gaps between relatively-short treads for the wheel in its travel upon the track.

10. In combination, a traction-wheel and a self-laying endless track therefor extending about the wheel and comprising longitudinal series of flexibly-interconnected shoes and side-links mutually lapping each other, with longitudinal flanges on the inner faces of the shoes, said links and flanges having raised intermediate sections forming unbridged gaps between relatively-short treads for the wheel in its travel upon the track.

11. In combination, a traction-wheel and a self-laying endless track therefor extending about the wheel and comprising a plurality of longitudinal series of shoes provided on their inner faces with longitudinal flanges having raised intermediate sections, the shoes in each series successively lapping those in the adjacent series and being flexibly interconnected, and said raised sections forming unbridged gaps between relatively-short treads for the wheel in its travel upon the track.

12. In combination, a traction-wheel and a self-laying endless track therefor extending about the wheel and comprising a plurality of longitudinal series of shoes, the shoes in each series successively lapping those in the adjacent series and each shoe in each series being flexibly connected at different points between series with two successive shoes in the adjacent series, and steps on the shoes forming unbridged gaps between relatively-short treads for the wheel in its travel upon the track.

13. In combination, a traction-wheel and a self-laying track therefor extending about the wheel and comprising a plurality of longitudinal series of shoes provided with longitudinal flanges on their inner faces, the shoes in each series successively lapping those in the adjacent series, rods extending at intervals through the lapping flanges and pivotally connecting each shoe in each series with the portions lapping it of the two successive shoes in the adjacent series, and links connecting the rods in pairs at their adjacent ends, said shoe-flanges and links having intermediate raised sections forming steps for the wheel in its travel upon the track.

14. In combination, a traction-wheel and a self-laying track therefor comprising a central series of shoes provided with longitudinal flanges on their inner faces, and a series of relatively-narrower shoes extending along each side of said central series and provided with longitudinal flanges on their inner faces, the shoes in each series successively lapping those in the other series, rods extending at intervals through the successively lapping flanges and pivotally connecting each shoe in each series with those portions lapping it of the respective shoes in the other series, and links connecting the rods in pairs at their projecting ends, said shoe-flanges having intermediate raised sections forming steps for the wheel in its travel upon the track.

CHARLES B. COON.

In the presence of—
R. A. RAYMOND,
A. C. FISCHER.